United States Patent
Tangudu et al.

(10) Patent No.: US 10,812,294 B2
(45) Date of Patent: Oct. 20, 2020

(54) CHANNEL ESTIMATION METHOD AND SYSTEM FOR IQ IMBALANCE AND LOCAL OSCILLATOR LEAKAGE CORRECTION

(71) Applicant: TEXAS INSTRUMENTS INCORPORATED, Dallas, TX (US)

(72) Inventors: Jawaharlal Tangudu, Bengaluru (IN); Sashidharan Venkatraman, Bengaluru (IN); Sarma Sundareswara Gunturi, Bengaluru (IN); Chandrasekhar Sriram, Chennai (IN); Sthanunathan Ramakrishnan, Bengaluru (IN); Ram Narayan Krishna Nama Mony, Kanyakumari (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/684,842

(22) Filed: Nov. 15, 2019

(65) Prior Publication Data

US 2020/0169434 A1    May 28, 2020

Related U.S. Application Data

(60) Provisional application No. 62/786,496, filed on Dec. 30, 2018.

(30) Foreign Application Priority Data

Nov. 28, 2018    (IN) .............................. 201841044799

(51) Int. Cl.
| H03H 7/30 | (2006.01) |
| H03H 7/40 | (2006.01) |
| H03K 5/159 | (2006.01) |
| H04L 25/02 | (2006.01) |
| H04B 1/02 | (2006.01) |
| H04B 17/11 | (2015.01) |

(52) U.S. Cl.
CPC .......... *H04L 25/0202* (2013.01); *H04B 1/02* (2013.01); *H04B 17/11* (2015.01)

(58) Field of Classification Search
CPC ... H04L 25/0202; H04L 7/033; H04L 27/366; H04L 27/361; H04L 27/364; H04L 27/3863; H04B 1/02; H04B 17/11; H04B 1/30; H04B 1/525; H03F 1/3247; H03D 3/009
USPC ......................................... 375/235, 296, 297
See application file for complete search history.

(56) References Cited

U.S. PATENT DOCUMENTS

| 7,020,226 B1 | 3/2006 | Kirkland |
| 8,204,102 B2 | 6/2012 | O'Leary et al. |
| 10,097,396 B2 * | 10/2018 | Sestok, IV ............ H04L 27/366 |

(Continued)

*Primary Examiner* — Phuong Phu
(74) *Attorney, Agent, or Firm* — John R. Pessetto; Charles A. Brill; Frank D. Cimino

(57) ABSTRACT

A channel estimation method and system for IQ imbalance and local oscillator leakage correction, wherein an example of a channel estimation system comprising a calibrating signal generator configured to generate at least one pair of calibrating signals, a feedback IQ mismatch estimator configured to measure feedback IQ mismatch estimates based on the pair of calibrating signals, and a calibrating signal based channel estimator configured to generate a channel estimate based on the pair of calibrating signals and the feedback IQ mismatch estimates.

24 Claims, 6 Drawing Sheets

(56) References Cited

U.S. PATENT DOCUMENTS

| | | | |
|---|---|---|---|
| 10,382,087 B1* | 8/2019 | Dror | H04B 1/525 |
| 10,484,108 B1 | 11/2019 | Al-Qaq | |
| 2004/0203472 A1* | 10/2004 | Chien | H04B 1/30 |
| | | | 455/68 |
| 2004/0218522 A1 | 11/2004 | Sundstrom et al. | |
| 2005/0220056 A1 | 10/2005 | Itoh | |
| 2006/0203710 A1 | 9/2006 | Mukkavilli et al. | |
| 2008/0025381 A1* | 1/2008 | Lee | H04B 1/30 |
| | | | 375/219 |
| 2008/0212662 A1* | 9/2008 | Lee | H03D 3/009 |
| | | | 375/224 |
| 2010/0027689 A1 | 2/2010 | Kohlmann | |
| 2010/0313094 A1* | 12/2010 | Kubota | H04L 27/3863 |
| | | | 714/746 |
| 2010/0330929 A1 | 12/2010 | Heutmaker et al. | |
| 2012/0115412 A1 | 5/2012 | Gainey et al. | |
| 2012/0250790 A1* | 10/2012 | Yang | H03F 1/3247 |
| | | | 375/296 |
| 2012/0263215 A1 | 10/2012 | Peng | |
| 2012/0300818 A1* | 11/2012 | Metreaud | H04B 1/30 |
| | | | 375/219 |
| 2012/0328041 A1* | 12/2012 | Chen | H04L 27/364 |
| | | | 375/285 |
| 2015/0094082 A1 | 4/2015 | Gupta et al. | |
| 2016/0182162 A1* | 6/2016 | Belitzer | H04L 27/361 |
| | | | 375/261 |
| 2016/0359614 A1* | 12/2016 | Hao | H04L 7/033 |
| 2019/0036749 A1* | 1/2019 | Erez | H04B 1/30 |
| 2020/0028500 A1 | 1/2020 | Cheng et al. | |

* cited by examiner

CHANNEL ESTIMATION METHOD AND SYSTEM FOR IQ IMBALANCE AND LOCAL OSCILLATOR LEAKAGE CORRECTION

RELATED APPLICATIONS

This application claims priority to Indian Provisional Application No. 201841044799, filed on Nov. 28, 2018, and U.S. Provisional Application No. 62/786,496, filed on Dec. 30, 2018, which are hereby incorporated by reference.

BACKGROUND

Zero-IF transmitter employs homodyne or direct up-conversion to transmit a pair of quadrature signals, i.e., signals that differ in phase by 90 degrees. The reference signal of the pair of quadrature signals, which is "in-phase," is referred to as I signal. The signal that is shifted 90 degrees, and is in "quadrature" phase, is referred to as Q signal. During the homodyne up-conversation, the I and Q baseband signals are mixed with the in-phase and quadrature-phase components of a local oscillator (LO) signal to generate I and Q RF signals for transmission.

During a direct up-conversion, it is important to maintain the amplitude relationship between the I and Q signals after the mix to ensure an accurate signal transmission. It is also important to maintain the phase relationship between the in-phase and quadrature-phase components of the local oscillator to prevent a phase skew. In reality, however, errors such as an IQ gain/phase imbalance existing in a zero-IF transmitter impairs the amplitude relationship and the phase relationship between the I and Q RF signals, resulting in images of transmitted signal reflected about the local oscillator frequency. Furthermore, DC offset in the I and Q RF signals prior to up-conversion may result in a spurious tone signal at the local oscillator frequency A correction is attempted before the IQ baseband signals are mixed with the in-phase and quadrature components of the local oscillator to compensate for errors such as the IQ imbalance or DC offset. To determine the correction, a zero-IF transmitter output is fed back to a feedback receiver chain, and the output of the feedback chain is observed. The determination of the correction, however, is based on channel response characteristics (from transmitter to feedback chain output), which vary from frequency to frequency and not readily determinable.

SUMMARY

An aspect of the present invention provides a channel estimation system comprising a calibrating signal generator configured to generate at least one pair of calibrating signals, a feedback IQ mismatch estimator configured to measure feedback IQ mismatch estimates based on the pair of calibrating signals, and a calibrating signal based channel estimator configured to generate a channel estimate based on the pair of calibrating signals and the feedback IQ mismatch estimates.

Another aspect of the present invention provides a channel estimation system comprising a traffic signal based channel estimator configured to estimate a channel response estimation corresponding to a frequency of an input baseband traffic signal, a calibrating signal generator configured to generate a calibrating signal based on the channel response estimation by the traffic signal based channel estimator, and a correction filter configured to compensate a subsequent input baseband traffic signal to cancel an image signal of the subsequent input baseband traffic signal based on the calibrating signal.

Another aspect of the present invention provides a channel estimation system comprising, a calibrating signal generator configured to generate at least one pair of calibrating signals from which a channel response is estimated, a feedback direct current (DC) estimator configured to measure feedback DC estimates based on the pair of calibrating signals, a transmitter DC estimator configured to measure DC levels of the channel estimation system, and a calibrating signal based channel estimator configured to generate a channel estimate based on the pair of calibrating signals, feedback DC estimates and the measured DC levels.

BRIEF DESCRIPTION OF THE DRAWINGS

For a detailed description of various examples, reference will now be made to the accompanying drawings in which.

DETAILED DESCRIPTION

In the following detailed description, reference is made to certain examples of the present invention. These examples are described with sufficient detail to enable those skilled in the art to practice them. It is to be understood that other examples may be employed and that various structural, logical, and electrical changes may be made. Moreover, while specific examples are described in connection with a zero-IF transmitter, it should be understood that features described herein are generally applicable to other types of electronic parts, circuits, or transmitters.

In this description, the term "couple" or "couples" means either an indirect or direct wired or wireless connection. Thus, if a first device couples to a second device, that connection may be through a direct connection or through an indirect connection via other devices and connections. For another instance, when a first device is coupled to a second device, the first and second device may be coupled through a capacitor. The recitation "based on" means "based at least in part on." Therefore, if X is based on Y, X may be a function of Y and any number of other factors.

Figure 1:
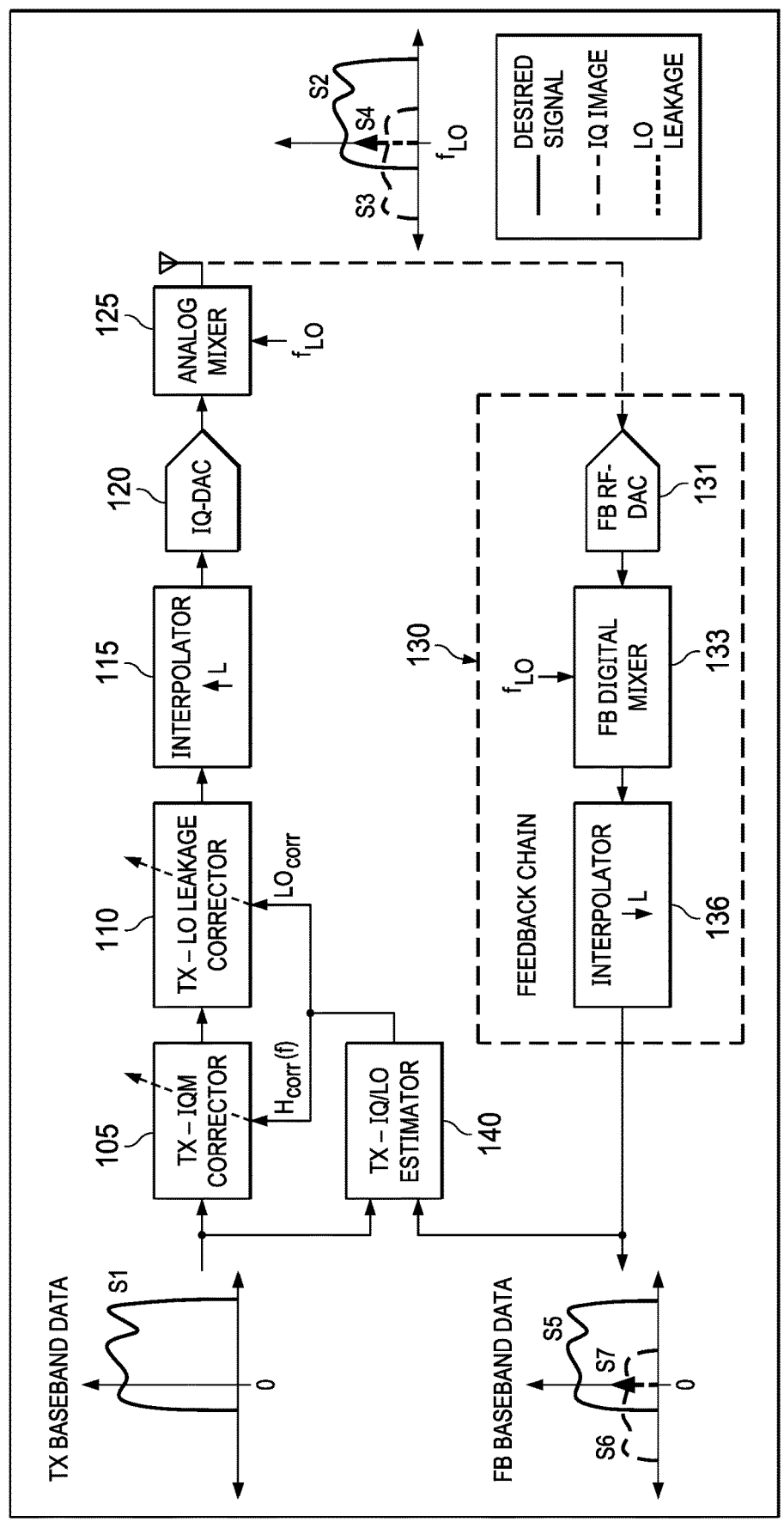
FIG. 1 illustrates a block diagram of a zero-IF transmitter.

FIG. 1 illustrates a block diagram of a zero-IF transmitter with a feedback chain sampling RF signals. The zero-IF transmitter example of FIG. 1 comprises Tx-IQM corrector 105 configured to adjust the baseband signal S1 to compensate for an IQ mismatch during transmission, Tx-LO corrector 110 configured to adjust the baseband signal S1 to compensate for LO leakage during transmission, interpolator 115, IQ digital analog converter 120, and analog mixer 125 configured to mix the baseband signal S1 with an in-phase and quadrature-phase component of a local oscillator signal of frequency $f_{LO}$.

Signals S2, S3, and S4 are frequency domain signals observed by a receiver after the zero-IF transmitter of FIG. 1 transmits IQ RF signals based on signal S1. Signal S2 is a signal that is desired to be transmitted by the zero-IF transmitter, signal S3 is an image signal of signal S2 due to IQ mismatch, and signal S4 is an DC offset due to LO leakage. Feedback chain 130 loops back the transmit signals through a feedback RF analog-to-digital converter 131, feedback digital mixer 133 mixing the feedback signal with a local oscillator signal of frequency $f_{LO}$, and interpolator 136.

Signals S5, S6, and S7 are signals measured at an end of feedback chain 130 after the transmit signals S2, S3, and S4 are fed back. Signal S5 corresponds to signal S2, signal S6 to signal S3, and signal S7 to signal S4. Tx-IQ/LO estimator 140 estimates a channel response based on signals S1 and S5-S7, and further estimates IQ mismatch for a respective frequency and LO leakage. Based on the IQ mismatch estimates and LO leakage, Tx-IQ/LO estimator 140 provides a IQ mismatch correction function $H_{corr}(f)$ and LO leakage correction function $LO_{corr}$ to Tx-IQM corrector 105 and Tx-LO leakage corrector 110, respectively. Tx-IQM corrector 105 and Tx-LO leakage corrector 110 adjust signal S1 to compensate for IQ mismatch and LO leakage during transmission based on $H_{corr}(f)$ and $LO_{corr}$.

Figure 2A:
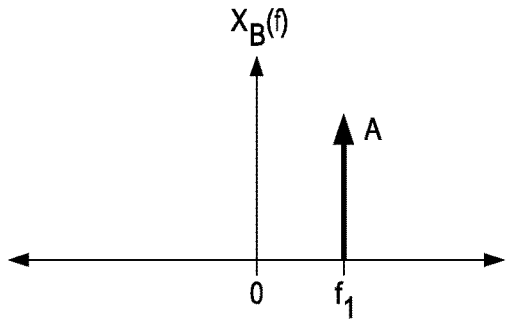
FIGS. 2A and 2B illustrate a frequency spectrum of a baseband signal transmitted via a direction up-conversion and a frequency spectrum of the feedback signals.
Figure 2B:
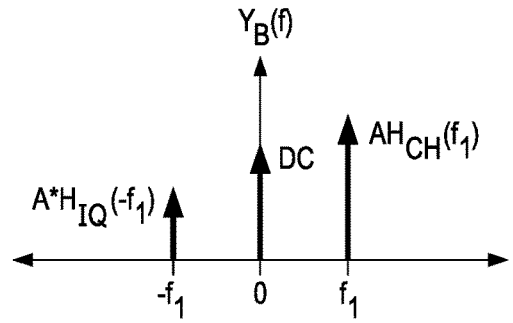

FIGS. 2A and 2B illustrate a frequency spectrum of a baseband signal, X(f), transmitted via a direct up-conversion and a frequency spectrum of the feedback signals, $AH_{CH}$ (f1), DC, and $A^*H_{IQ}(-f1)$. In particular, graph of FIG. 2A illustrates a baseband signal X(f), a single tone signal of frequency $f_1$, to be transmitted via a zero-IF transmitter. Based on the single tone signal of graph 1(a), the zero-IF transmitter generates a pair of IQ signals (i.e., quadrature signals) for transmission by mixing the baseband signal with the in-phase and quadrature-phase components of a local oscillator signal with frequency $f_{LO}$. During the oscillation, however, IQ gain or phase imbalance may be introduced, skewing the gain or phase relationship of the RF quadrature signals. This results in a transmission of an image signal, a RF signal with frequency $f_{LO}-f_1$, in addition to the transmission of a desired signal, a RF signal with frequency $f_{LO}+f_1$. Furthermore, an uncorrected DC in a baseband signal is also up-converted to the local oscillator frequency at the transmitter output (i.e., LO leakage).

Graph of FIG. 2B illustrates a frequency spectrum of feedback signals observed at the output of the feedback chain after or with the transmission of the pair of RF quadrature signals. The feedback signals are down-converted to baseband signals by a feedback module of the zero-IF transmitter. As illustrated in graph 2B, although only signal X(f) of frequency $f_1$, illustrated in graph 2A, was upconverted for transmission by the zero-IF transmission, three signals are observed from the feedback signals.

The three signals are signal $AH_{CH}(f_1)$, signal DC and signal $A^*H_{IQ}(-f_1)$, as shown in graph 1(b). Signal $AH_C(f_1)$ corresponds to the original signal X(f) with frequency f1, where $H_C(f_1)$ is a channel response at frequency $f_1$. Signal DC corresponds to the leaked local oscillator signal of frequency $f_{LO}$. Signal $A^*H_{IQ}(-f_1)$ corresponds to an image signal of negative frequency $-f_1$ due to the IQ mismatch of the zero-IF transmitter.

To compensate for an IQ mismatch and LO leakage, the zero-IF transmitter may adjust signal X(f) to cancel signal $A^*H_{IQ}(-f_1)$ and signal DC during transmission. To adjust a signal to compensate the changes due to an IQ mismatch and LO leakage, however, the transmitter-to-feedback chain channel response at a frequency corresponding to the image signal and LO leakage must be estimated. The feedback signals based on an input signal $X(f_1)$ is used to estimate a channel response at frequency $f_1$, by performing a frequency domain cross correlation of components of transmitter and feedback baseband data falling at $f_1$, but not for the channel responses at a frequency corresponding to the image signal and LO leakage.

According to an aspect of the present invention, calibrating signals are generated and transmitted to determine channel responses at a frequency corresponding to the image signal. In one example, a first calibrating signal based on a baseband signal with frequency $f_1$ may be transmitted, followed by a second calibrating signal based on the baseband signal with frequency $f_1$. The first and second calibrating signals are each transmitted at different time slots, preferably consecutively. First and second feedback signals, each corresponding to the first and second calibrating signals, are measured. An aspect of the present invention determines a channel response corresponding to frequency $-f_1$ based on the first and second feedback signals.

According to another aspect of the present invention, calibrating signals are generated and transmitted to determine channel response at a frequency corresponding to LO leakage. In one example, a first calibrating signal and a second calibrating signal are generated. The first and second calibrating signals are each transmitted at different time slots, preferably consecutively. First and second feedback signals, each corresponding to the first and second calibrating signals, are measured. An aspect of the present invention determines a channel response corresponding to the LO leakage based on the first and second feedback signals.

Below, examples of various aspects of the present invention are further described with an exemplary figure of the examples.

Figure 3:
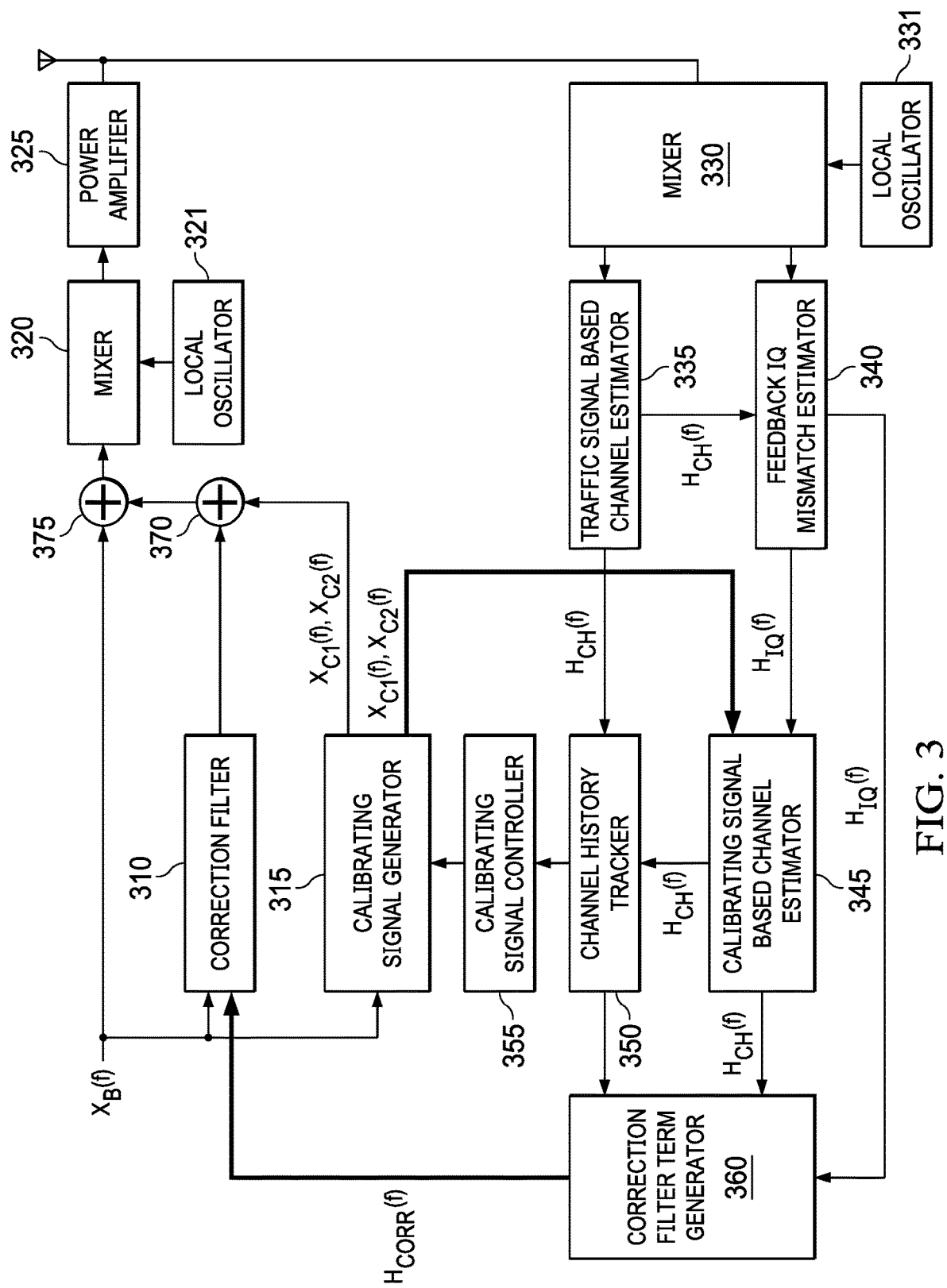
FIG. 3 illustrates a block diagram of a channel estimation system according to an aspect of the present invention.

FIG. 3 illustrates a block diagram of a channel estimation system according to an aspect of the present invention. In FIG. 3, baseband signal $X_B(f)$ is provided to calibrating signal generator 315. Calibrating signal generator 315 generates at least two calibrating signals based on signal $X_B(f)$, a baseband signal. In one example, calibrating signal $X_{C1}(f)$ is generated by calibrating signal generator 315, followed by calibrating signal $X_{C2}(f)$ according to the below equations 1 and 2.

$$X_{C1}(f)=\Delta X^*_B(-f); \quad \text{Eq. 1.}$$

$$X_{C2}(f)=-\Delta X^*_B(-f); \quad \text{Eq. 2.}$$

Calibrating signals $X_{C1}(f)$ and $X_{C2}(f)$ are generated non-simultaneously—the signals are generated consecutively. To generate calibrating signals $X_{C1}(f)$ and $X_{C2}(f)$, calibrating signal generator 315 comprises a conjugate translator to generate a conjugate signal of a baseband signal $X_B(f)$.

In equations 1 and 2, $\Delta$ is a random constant. In another example, $\Delta$ may be a function of a frequency (e.g., $\Delta(f)$), which allows calibrating signal generator 315 to generate a calibrating signal of a specific frequency. In another example, $X_{C1}(f)$ is $\Delta_1 X^*_B(-f)$ and $X_{C2}(f)$ is $\Delta_2 X^*_B(-f)$, where $\Delta_1$ and $\Delta_2$ are each random constant. In another example, the magnitude of $\Delta$ is proportional to residual IQ mismatch image level, i.e., the uncorrected IQ mismatch image level.

Signals $X_{C1}(f)$ and $X_{C2}(f)$ are consecutively up-converted by mixer 320, which uses a mixing frequency generated by local oscillator 321, and further amplified by power amplifier 325 for transmission. Mixer 330 in the feedback chain down-converts the signal outputs from power amplifier 325, based on a mixing frequency generated by local oscillator 331.

Traffic signal based channel estimator 335 performs a frequency domain correlation of a baseband traffic signal with a down-converted signal output from mixer 330 to determine a channel response corresponding to the baseband signal frequency. For instance, in FIG. 2, a baseband traffic signal is signal A of frequency $f_1$, and a down-converted signal output from mixer 330 at frequency $f_1$ is signal $AH_{CH}(f_1)$. Traffic signal based channel estimator 335 correlates the baseband traffic signal of frequency $f_1$, signal A, with the down-converted signal output at frequency $f_1$, signal $AH_{CH}(f_1)$, and generates a channel response at frequency $f_1$, $H_{CH}(f_1)$.

Feedback IQ mismatch estimator 340 measures feedback signals based on the two calibrating signals $X_{C1}(f)$ and $X_{C2}(f)$, and generates corresponding frequency domain IQ mismatch estimates by performing a frequency domain correlation of a transmitted signal and a fed-back signal at a respective frequency. For example, IQ mismatch estimate $H_{IQ}(-f)$ is measured by performing a frequency domain correction of a transmitted signal component at frequency 'f' with a feedback signal component at frequency '-f.'

Pursuant to equations 1 and 2 noted above, the two calibrating signals are generated, in series in different times, by calibrating signal generator 315, up-converted and down-converted by mixers 320 and 330, and fed into feedback IQ mismatch estimator 340, in series. Based on the feedback signals, feedback IQ mismatch estimator 340 generates IQ mismatch estimates for each calibrating signal. For example, feedback IQ mismatch estimator 340 generates IQ estimate $H_{IQ1}(f)$, an IQ mismatch estimate based on a fed-back signal measured by feedback IQ mismatch estimator 340 after first calibrating signal $X_{C1}(f)$ is transmitted. Feedback IQ mismatch estimator 340 further generates IQ estimate $H_{IQ2}(f)$, an IQ mismatch estimate based on a fed-back signal measured by feedback IQ mismatch estimator 340 after second calibrating signal $X_{C2}(f)$ is transmitted.

Based on IQ estimates $H_{IQ1}(f)$ and $H_{IQ2}(f)$, calibrating signal based channel estimator 345 estimates a channel response corresponding to the image signal of the baseband signal $X_B(f)$ according to equation 3 below.

$$H_{CH}(f)=(H_{IQ2}(f)-H_{IQ1}(f))/2\Delta. \qquad \text{Eq. 3.}$$

In the example of FIG. 2, feedback IQ mismatch estimator 340 measures an IQ mismatch estimate $H_{IQ}(-f_1)$, which corresponds to a frequency bin of an image signal after a transmission of a baseband signal with frequency $f_1$. In FIG. 2 example, the channel response corresponding to the image signal, estimated by calibrating signal based channel estimator 345 pursuant to the above equation 3, is expressed as $H_{CH}(-f_1)=(H_{IQ2}(-f_1)-H_{IQ1}(-f_1))/(2\Delta)$. Correction filter generator 360 generates a correction function $H_{CORR}(f_1)$ calculated based on $H_{IQ}(-f_1)$ to cancel the image signal of a subsequent baseband signal with frequency $f_1$ during transmission. The correction function at $-f_1$, $H_{CORR}(-f_1)$, is calculated according to equation 4 below.

$$H_{CORR}(-f_1)=H_{IQ}(-f_1)/H_{CH}(-f_1). \qquad \text{Eq. 4.}$$

In other words, by applying the $H_{CORR}(-f_1)$ generated by correction filter term generator 360, correction filter 310 adjusts a subsequent baseband signal with frequency $f_1$ to cancel out an image signal caused by an IQ mismatch.

The example of FIG. 3 also comprises adder 370 and adder 375. With adders 370, 375, calibrating signals generated calibrating signal generator 315 are added to a baseband traffic signal for transmission. For instance, with both adders 370, 375, signals generated according to below equations 5 and 6 are output to mixer 320 after calibrating signal generator 315 generates a pair of calibrating signals.

$$X_B(f)+\Delta X^*_B(-f), \qquad \text{Eq. 5.}$$

$$X_B(f)-\Delta X^*_B(-f), \qquad \text{Eq. 6.}$$

Optionally, the example of FIG. 3 comprises channel history tracker 350 and calibrating signal controller 355. Channel history tracker 350 stores channel estimate(s) generated by traffic signal based channel estimator 335 and calibrating signal based channel estimator 345. Where no corresponding image signal channel estimate is stored in channel history tracker 350, calibrating signal controller 355 controls calibrating signal generator 315 to generate a pair of calibrating signals from which the respective image signal channel estimate may be derived pursuant to above equations 1~6.

For instance, where a baseband traffic signal of frequency $f_1$ is transmitted, traffic signal based channel estimator 335 generates a channel estimate for frequency $f_1$. If channel history tracker 350 does not store a corresponding image signal channel estimate, i.e., channel estimate for frequency $-f_1$, however, calibrating signal controller 315 controls calibrating signal generator 315 to generate a pair of calibrating signal to enable channel estimation at $-f_1$. For instance, the pair of calibrating signals may be, $X_{C1}(-f_1)=\Delta X^*_B(f_1)$ and $X_{C2}(-f_1)=-\Delta X^*_B(f_1)$.

Based on the pair of calibrating signals, calibrating signal based channel estimator 345 generates a channel estimate for frequency $-f_1$, based on equation 3. The channel estimate for frequency $-f_1$ is stored in channel history tracker 350 for further use.

Figure 4:
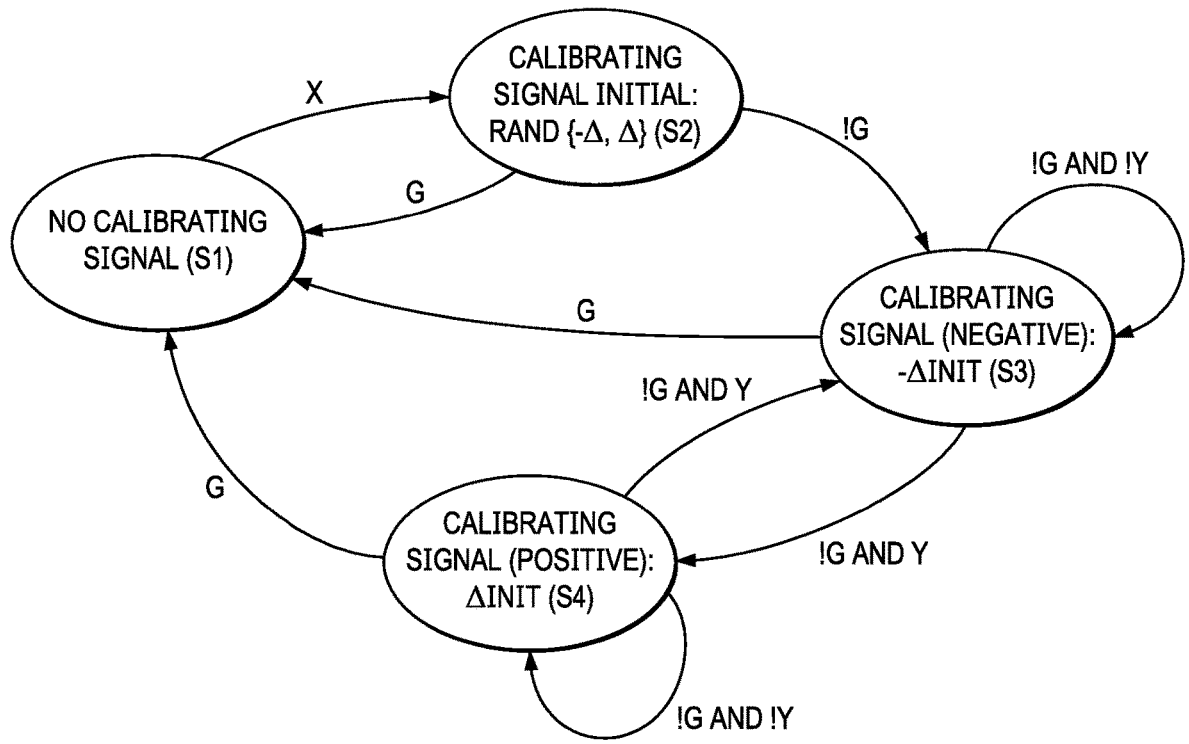
FIG. 4 illustrates a state machine diagram of a calibrating signal controller of a channel estimation system of FIG. 3 according to an aspect of the present invention.

FIG. 4 illustrates a state machine diagram of a baseband signal correction module according to an aspect of the present invention. In particular, the state machine diagram of FIG. 4 illustrates the operations of calibrating signal generator 315 and calibrating signal controller 355 of FIG. 3. In FIG. 4, calibrating signals are generated by calibrating signal generator 315 only where calibrating signal controller 355 determines a need for a channel response estimation.

In the state machine diagram of FIG. 4, X indicates where calibrating signal controller 315 determined a need for a channel response estimation at a frequency. G indicates that all relevant channel response is estimated. Y indicates a valid feedback signal is measured after a generation of a calibrating signal.

The state machine diagram starts from state S1 where calibrating signal controller 315 determines that not all relevant channel response is stored in channel history tracker 350 and there is a need to estimate a channel response at a frequency. In such case, the signal transmitter of FIG. 3 transitions into state S2 where calibrating signal controller 315 generates a first calibrating signal $X_{C1}(f)$ according to equation 1 for transmission. In state S2, $\Delta$ is randomly selected. After the transmission of the first calibrating signal $X_{C1}(f)$, the signal transmitter of FIG. 3 determines whether all relevant channel response is estimated. If all relevant channel response is estimated, condition G is satisfied and the signal transmitter of FIG. 3 transitions into state S1.

If not all relevant channel response is estimated, however, the signal transmitter of FIG. 3 transitions into state S3. During state S3, calibrating signal controller 315 generates a second calibrating signal $X_{C2}(f)$ according to equation 2 for transmission. After the transmission of the second calibrating signal $X_{C2}(f)$, the signal transmitter of FIG. 3 estimates a channel response based on the first and second calibrating signals, the feedback signals, and IQ mismatch estimates based on the functions. After, if calibrating signal controller 315 determines all relevant channel response is estimated, the signal transmitter of FIG. 3 transitions into state S1.

However, if calibrating signal controller 315 determines not all relevant channel response is estimated, the signal transmitter of FIG. 3 determines whether it has received a valid feedback signals after the transmission of the first and second calibrating signals. If no valid feedback signals were received by the quadrature signal transmitter of FIG. 3, calibrating signal generator 210 generates the second calibrating signal for the second time for transmission. Afterwards, the signal transmitter of FIG. 3 determines a channel response.

If valid feedback signals were received by the signal transmitter of FIG. 3, however, the signal transmitter of FIG. 3 transitions into state S4, where calibrating signal generator 315 generates the first calibrating signal for the second time for transmission. Afterwards, the signal transmitter of FIG. 3 to determines a channel response.

If all relevant channel response is estimated in state S4, the signal transmitter of FIG. 3 transitions into state S1. In this state, the correction filter term is regenerated pursuant to the updated channel response so that the transmission is free of IQ mismatch. If all relevant channel response is not estimated in state S4 and no valid feedback signal was received in state S4, the quadrature signal transmitter of FIG. 3 generates the first calibrating signal again to estimate the relevant channel response.

In FIG. 4, the quadrature signal transmitter of FIG. 3 transitions into state S2 when valid feedback signal is received but not all relevant channel responses is estimated. In another example, state S2 is entered if the quality of the relevant channel responses is not sufficient. In state S2, calibrating signal generator 315 generates a new first calibrating signal based on a new constant $\Delta$ (or $\Delta(f)$) and repeat the processes of the state machine diagram until all relevant channel responses are estimated.

In another example, after the first pair of calibrating signals are generated according to equations 1 and 2, or after an image signal channel estimate is determined based on the calibrating signals, calibrating signal generator 315 stops to generate additional calibrating signals.

Calibrating signal controller 355 may later control calibrating signal generator 315 to again generate a pair of calibrating signal. For instance, after a pre-determined set of time has lapsed or the channel estimation system of FIG. 3 resets, calibrating signal controller may control calibrating signal generator 315 to regenerate a pair of calibrating signal from which an image signal channel estimate may be derived.

Figure 5:
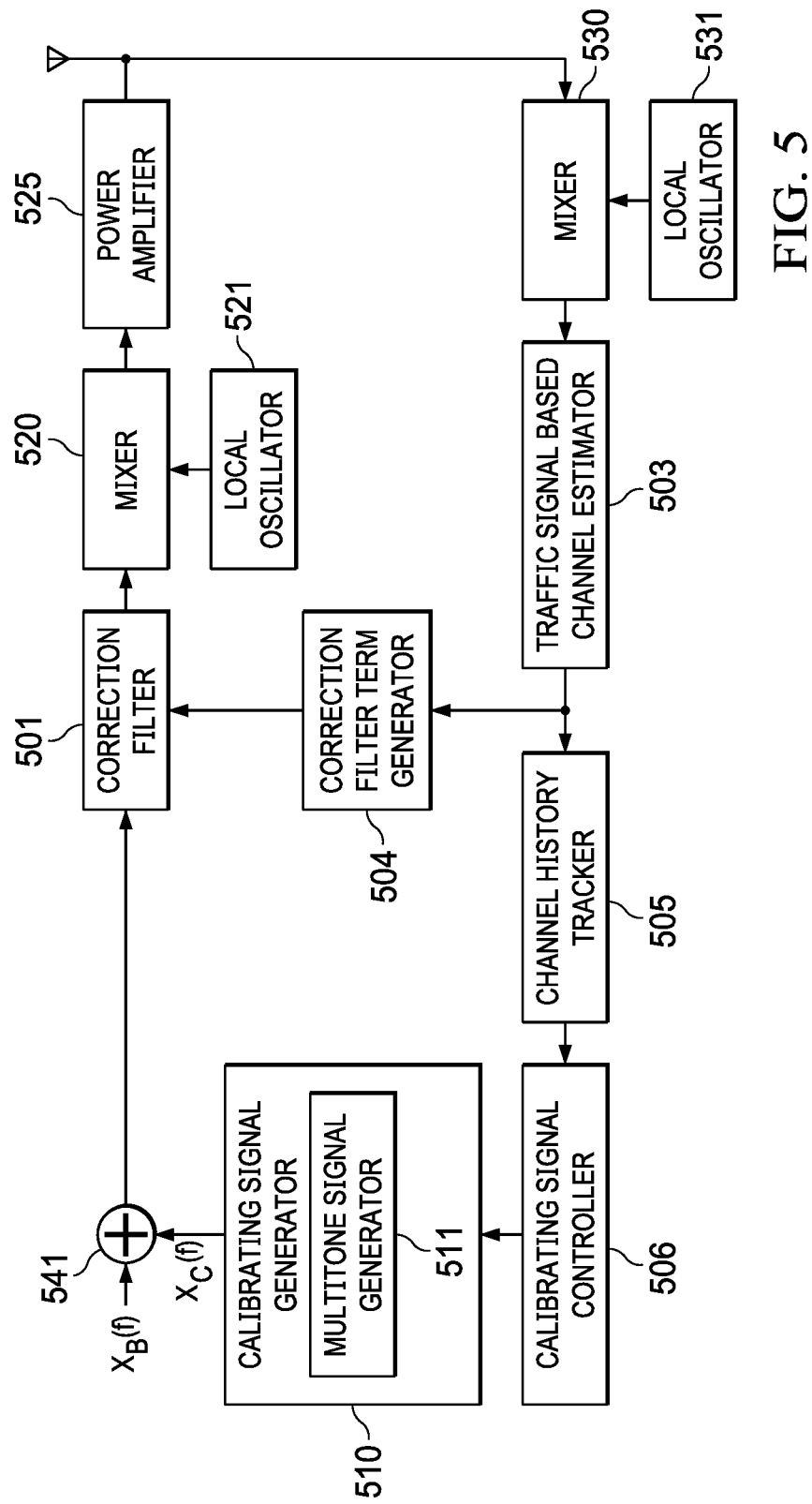
FIG. 5 illustrates a block diagram of a channel estimation system according to yet another aspect of the present invention.

FIG. 5 illustrates a block diagram of a channel estimation system according to yet another aspect of the present invention. The channel estimation system of FIG. 5 comprises correction filter 501, mixer 520, power amplifier 525, mixer 530, traffic signal based channel estimator 503, and channel history tracker 505, each of which respectively operates substantially similar to correction filter 310, mixer 320, power amplifier 325, mixer 330, traffic signal based channel estimator 335, and channel history tracker 350 of FIG. 3. For example, mixer 520 performs frequency translation of the outputs from correction filter 501 based on a mixing frequency generated by local oscillator 521, similar to mixer 320 of FIG. 3. Mixer 530 performs frequency translation to down-covert the outputs from power amplifier 525, based on a mixing frequency generated by local oscillator 531.

The channel estimation system of FIG. 5 further comprises calibrating signal generator 510, which adds tones (i.e., calibrating signals) at frequencies where channel estimates are required but not available in channel history tracker 505. Calibrating signal generator 510 comprises multitone signal generator 511 to generate calibrating signal $X_C(f)$, of multiple frequencies, to be added to the input signal $X_B(f)$ via adder 541.

In one example, the tones generated by calibrating signal generator 510 is based on a channel response estimation generated by traffic signal based channel estimator 503. In the example of FIG. 5, traffic signal based channel estimator 503 is configured to estimate a channel response corresponding to a frequency of the baseband traffic signal $X_B(f)$ by performing a frequency domain correlation of an input baseband traffic signal $X_B(f)$ and the down-converted baseband traffic signal that is output of mixer 530. Correction filter term generator 504 is configured to generate a filter term to compensate an input baseband signal for IQ mismatch based on the channel response estimation generated by traffic signal based channel estimator 503. Correction filter 501 compensates an input baseband traffic signal based on the filter term generated by correction filter term generator 504.

Calibrating signal controller 506 determines a need for a channel response estimation according to a state machine similar to the state machine of FIG. 4 and triggers the calibrating signal generator 506 to generate appropriate calibrating signals. For example, channel history tracker 505 stores channel estimate(s) generated by traffic signal based channel estimator 503. Where no corresponding image signal channel estimate is stored in channel history tracker 505, calibrating signal controller 506 controls calibrating signal generator 510 to generate a calibrating signal of multiples frequencies to be added to the input signal $X_B(f)$ via adder 541.

The output of adder 541 is fed into correction filter 501. Based on the output of adder 541, correction filter 501 pre-neutralizes or pre-cancels out an image signal from the input signal $X_B(f)$. In other words, correction filter 501 pre-cancels out a projected image signal, based on the calibrating signal $X_C(f)$, so that an image signal is canceled out from the signal output from power amplifier 530 for transmission.

Figure 6:
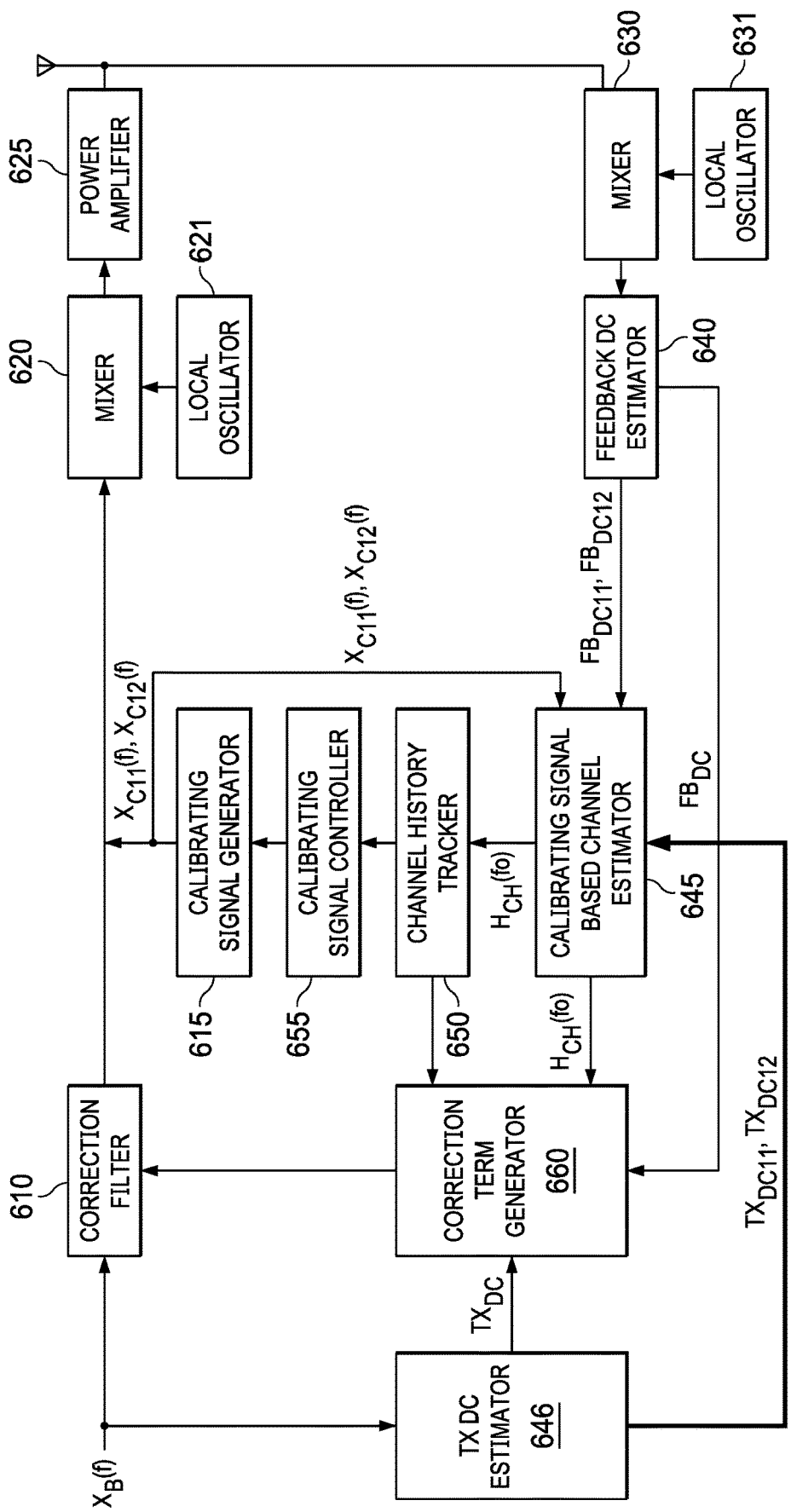
FIG. 6 illustrates a block diagram of a channel estimation system according to yet another aspect of the present invention.

FIG. 6 illustrates a block diagram of a channel estimation system according to an aspect of the present invention. The example—of signal transmitter of FIG. 6 comprises calibrating signal generator 610 configured to generate at least two calibrating signals $X_{C11}(f)$ and $X_{C12}(f)$ according to the below equations 7 and 8.

$$X_{C11}(f)=\Delta_1; \qquad \text{Eq. 7.}$$

$$X_{C12}(f)=\Delta_2. \qquad \text{Eq. 8.}$$

In one example, $\Delta_2$ may be $-\Delta_1$.

Calibrating signals $X_{C11}(f)$ and $X_{C12}(f)$ are generated non-simultaneously—the signals are generated consecutively at different time slots. Signals $X_{C11}(f)$ and $X_{C12}(f)$ are consecutively up-converted by mixer 620, based on a mixing frequency generated by local oscillator 621, and further amplified by power amplifier 625 for transmission. Mixer 630 down-converts the signal outputs from power amplifier 625, based on a mixing frequency generated by local oscillator 631.

Feedback DC estimator 640 measures feedback signals, each based on a respective one of the two calibrating signals $X_{C11}(f)$ and $X_{C12}(f)$, and generates corresponding feedback DC estimates, $FB_{DC11}$, $FB_{DC12}$. In one example, feedback DC estimates, $FB_{DC11}$, $FB_{DC12}$, are measured by performing a DC-level estimation (e.g., low pass filter) on the respective feedback signals. Feedback DC estimate $FB_{DC11}$ is based on calibrating signal $X_{C11}(f)$ and a fed-back signal thereof. Feedback estimate $FB_{DC12}$ is based on calibrating signal $X_{C12}(f)$ and a fed-back signal thereof.

TX DC estimator 646 measures DC levels in the transmit baseband signal and forwards the measurements to calibrating signal based channel estimator 645. $TX_{DC11}$ represents DC levels measured when calibrating signal $X_{C11}(f)$ is transmitted. $TX_{DC12}$ represents DC levels measured when calibrating signal $X_{C12}(f)$ is transmitted.

Calibrating signal based channel estimator 645 estimates a channel response at a frequency corresponding to a local oscillating frequency based on feedback DC estimates $FB_{DC1}$ and $FB_{DC2}$ and DC levels measured by TX DC estimator 646 according to equation 9 below.

$$H_{CH}(0)=(FB_{DC12}-FB_{DC11})/[(\Delta_2-\Delta_1)+(TX_{DC12}-TX_{DC11})] \quad \text{Eq. 9.}$$

Correction filter term generator 660 generates filter term for correction filter 610 to correct LO leakage based on channel estimate at LO leakage frequency. The filter term generated by correction filter term generator 660 is further based on the DC levels $TX_{DC}$ measured by TX DC estimator 646 of the time of the filter term generation. The filter term generated, which comprises LO leakage correction term in FIG. 6, is expressed in the equation 10 below.

$$LO_{CORR}=FB_{DC}/H_{CH}(0)-TX_{DC} \quad \text{Eq. 10.}$$

In an example, correction filter 610 may simply perform an add or subtract function. In such case, correction filter 610 may comprise a simple add or subtract module, and correction filter term generator 660 may comprises a correction term generator generating LO leakage correction term according to equation 10 and providing the generated result to the add or subtract module.

Optionally, the calibrating signal generator 615 of FIG. 6 generates N number of calibrating signals, spread over N time slots. TX DC estimator 646 measures N number of DC level estimates, each of the N number of DC level estimates corresponding to a respective one of the N number of calibrating signals. Feedback LO leakage estimator 640 generates N number of feedback LO leakage estimates, each of the N number of LO leakage estimates corresponding to a respective one of the N number of calibrating signals. The N number of calibrating signals are denoted as $Xc1-\Delta_1, \ldots, XcN-\Delta_N$, corresponding N number of LO leakages estimates as $FB_{DC1}, FB_{DC2}, \ldots, FB_{DCN}$, and corresponding N number of TX DC estimates $TX_{DC1}$, $TX_{DC2}, \ldots, TX_{DCN}$. In this example the channel estimate of LO leakage frequency estimated by calibrating signal based channel estimator is expressed in equation 11 below.

$$H_{ch}(0) = \frac{\sum_{i=1}^{N}(d_i - N\bar{d})FB_{DC,i}}{\left(N\sum_{i=1}^{N} d_i^2 - \bar{d}^2\right)}, \quad \text{Eq. 10}$$

where $d_i = TX_{DCi} + \Delta_i$ and $\bar{d} = \sum_{i=1}^{N} \frac{d_i}{N}$.

Similar to the example of channel estimation system of FIG. 3, the channel estimation system of FIG. 6 optionally comprises channel history tracker 650, operating similar to channel history tracker 350 of FIG. 3. The channel history tracker 650 of FIG. 3, however, tracks channels only at DC frequency while channel history tracker 350 of FIG. 3 tracks channels over the entire range of baseband frequencies. The channel estimation system of FIG. 6 also optionally comprises calibrating signal controller 655, operating similar to calibrating signal controller 355. Where the channel estimation system of FIG. 6 comprises channel history tracker 650 and calibrating signal controller 655, the state machine diagram of FIG. 4 similarly illustrates the operations of calibrating signal generator 615 and calibrating signal controller 655.

For example, channel history tracker 650 stores channel estimate generated from calibrating signal based channel estimator 645. Where no corresponding LO leakage channel estimate is stored in the channel history tracker 650, calibrating signal controller 655 controls calibrating signal generator 615 to generate a pair of calibrating signal from which a LO leakage channel estimate be derived pursuant to above equations 7~11.

Further, calibrating signals are generated by calibrating signal generator 615 only where calibrating signal controller 655 determines a need for a channel response estimation according to a state machine similar to the state machine of FIG. 4. When there is a need to generate a LO leakage channel response, calibrating signal controller 655 controls calibrating signal generator 615 to generate calibrating signals pursuant to equations 7 and 8. After the first pair of calibrating signals are generated according to equations 7 and 8, or after LO leakage channel estimate is determined based on the calibrating signals, calibrating signal generator 615 stops to generate additional calibrating signals.

Calibrating signal controller 655 may later control calibrating signal generator 615 to again generate a pair of calibrating signal. For instance, after a pre-determined set of time has lapsed or the channel estimation system of FIG. 6 resets, calibrating signal controller may control calibrating signal generator 615 to regenerate a pair of calibrating signal from which a LO leakage channel estimate may be derived.

According to yet another example of the present invention, the operations of channel estimation system of FIG. 3 and the operations of channel estimation system of FIG. 6 may be implemented in a single channel estimation system. The single channel estimation system is configured to estimate an image signal channel estimate according to the operations of channel estimation system of FIG. 3. The signal channel estimation system is further configured to estimate a LO leakage channel estimate according to the operations of channel estimation system of FIG. 6. Pursuant to the image signal channel estimate and the LO leakage channel estimate, a correction filter term generator of the signal channel estimation system generates a filter term pursuant to equations 4 and 10 for a correction filter of the signal channel estimation system. The correction filter of the signal channel estimation system corrects a baseband signal based on the filter terms to correct IQ mismatch and LO leakage during transmission.

Figure 7:
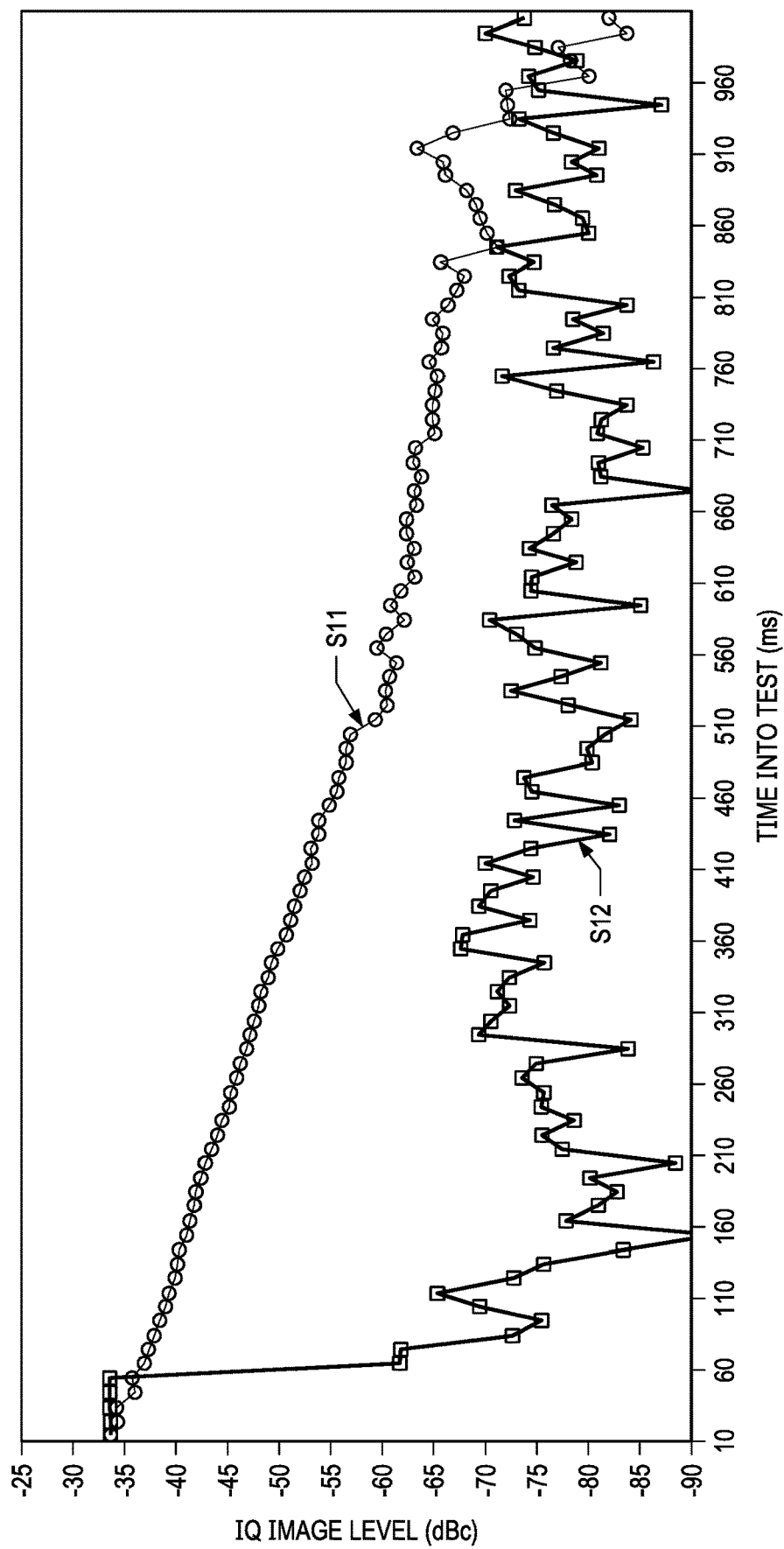
FIG. 7 illustrates a graph with an IQ mismatch compensation's convergence profile over time.

FIG. 7 illustrates a graph with an IQ mismatch compensation's convergence profile over time. In FIG. 7, line S11 indicates an IQ image level change over time according to a conventional IQ mismatch correction method. Line S12 indicates an IQ image level change over time according to an IQ mismatch correction method according to an aspect of the present invention. As illustrated, the IQ image level is suppressed more rapidly according the IQ mismatch correction method according to an aspect of the present invention.

The above description and drawings are only to be considered illustrative of an example of the present invention which achieves the features and advantages described herein. Modifications are possible in the described examples, and other examples are possible, within the scope of the claims. Accordingly, the examples of the present invention described herein is not considered as being limited by the foregoing description and drawings.

What is claimed is:

1. A channel estimation system comprising,
a calibrating signal generator configured to generate at least one pair of calibrating signals from which a channel response is estimated,
an up-conversion mixer coupled to the calibrating signal generator and is configured to up-convert the at least one pair of calibrating signals,
a down-conversion mixer coupled to the up-conversion mixer and configured to down-convert the at least one pair of calibrating signals,
a feedback IQ mismatch estimator coupled to the down-conversion mixer and is configured to measure feedback IQ mismatch estimates based on the down-converted calibrating signals,
a calibrating signal based channel estimator coupled to the feedback IQ mismatch estimator and is configured to generate the channel estimate based on the feedback IQ mismatch estimates and the at least one pair of calibrating signals,
wherein the at least one pair of calibrating signals are generated based on a baseband traffic signal, and the channel estimate generated by the calibrating signal based channel estimator comprises a channel response at frequency of an image signal to the baseband traffic signal.

2. The channel estimation system of claim 1,
wherein the at least one pair of calibrating signals comprises a first calibrating signal $X_{C1}(f)$ and a second calibrating signal $X_{C2}(f)$, and are expressed as below:

$$X_{C1}(f)=\Delta X^*_B(-f);$$

$$X_{C2}(f)=-\Delta X^*_B(-f).$$

wherein $X_B(f)$ is the baseband traffic signal and $\Delta$ is a random constant or a function of frequency to generate the first calibrating signal $X_{C1}(f)$ and second calibrating signal $X_{C2}(f)$ of a preset frequency.

3. The channel estimation system of claim 2,
wherein the magnitude of $\Delta$ is proportional to an IQ mismatch image level to be corrected based on the channel estimate generated by the calibrating signal based channel estimator.

4. The channel estimation system of claim 2,
wherein the first calibrating signal $X_{C1}(f)$ and the second calibrating signal $X_{C2}(f)$ are generated consecutively by the calibrating signal generator, up-converted consecutively by the up-conversion mixer, and down-converted consecutively by the down-conversion mixer.

5. The channel estimation system of claim 4,
wherein the feedback IQ mismatch estimator is configured to measure feedback signals based on the first and second calibrating signals $X_{C1}(f)$ and $X_{C2}(f)$ based on the down-converted signal output from the down-conversion mixer,
generates a first frequency domain IQ mismatch estimates $H_{IQ1}(f)$ by performing a frequency domain correlation of the first calibrating signal $X_{C1}(f)$ and a corresponding down-converted signal output from the down-conversion mixer, and
generates a second frequency domain IQ mismatch estimates $H_{IQ2}(f)$ by performing a frequency domain correlation of the second calibrating signal $X_{C2}(f)$ and a corresponding down-converted signal output from the down-conversion mixer.

6. The channel estimation system of claim 5,
wherein the calibrating signal based channel estimator is configured to generate the channel response at the frequency of the image signal of the baseband traffic signal $H_{CH}(f)$ according to an equation below, $$H_{CH}(f)=(H_{IQ2}(f)-H_{IQ1}(f))/2\Delta.$$

7. The channel estimation system of claim 6,
wherein the channel estimation system further comprises an adder coupled to the calibrating signal generator and the up-conversion mixer, and is configured to output the first and second calibrating signals $X_{C1}(f)$ and $X_{C2}(f)$ added to the baseband traffic signal $X_B(f)$ to the up-conversion mixer.

8. The channel estimation system of claim 7,
wherein channel estimation system further comprises,
a correction filter term generator coupled to the calibrating signal based channel estimator; and
a correction filter coupled to the correction filter term generator, and
wherein the correction filter term generator is configured to generate a correction filter term based on the channel response estimated by the calibrating signal based channel estimator and a feedback IQ mismatch estimate output from the feedback IQ mismatch estimator based on the baseband traffic signal, and
the correction filter is configured to correct a subsequent baseband traffic signal based on the correction filter term.

9. The channel estimation system of claim 8,
wherein the generated correction filter term comprises $H_{CORR}(f)$, which is generated according to an equation below, $$H_{CORR}(f)=H_{IQ}(f)/H_{CH}(f).$$

wherein $H_{IQ}(f)$ is the feedback IQ mismatch estimate output from the feedback IQ mismatch estimator based on the subsequent baseband traffic signal.

10. The channel estimation system of claim 8,
wherein the channel estimation system further comprises a traffic signal based channel estimator coupled to the down-conversion mixer and is configured to estimate a channel response corresponding to the frequency of the baseband traffic signal $X_B(f)$ by performing a frequency domain correlation of the baseband traffic signal $X_B(f)$ and a signal output of the down-converted mixer based on the baseband traffic signal $X_B(f)$.

11. The channel estimation system of claim 10,
wherein the channel estimation system further comprises,
a channel history tracker coupled to the traffic signal based channel estimator and the calibrating signal based channel estimator, and
a calibrating signal controller coupled to the calibrating signal generator, and
wherein the channel history tracker is configured to store a channel estimate generated from the traffic signal based channel estimator and calibrating signal based channel estimator, and the calibrating signal controller is configured to control the calibrating signal generator where no image signal channel estimate corresponding to a channel estimate generated by the traffic signal based channel estimator is stored in the channel history tracker.

12. A channel estimation system comprising,
an up-conversion mixer configured to up-convert an input baseband traffic signal $X_B(f)$ for transmission;
a down-conversion mixer coupled to the up-conversion mixer and is configured to down-convert the up-converted baseband traffic signal;
a traffic signal based channel estimator coupled to the down-conversion mixer and is configured to estimate a channel response corresponding to a frequency of the input baseband traffic signal $X_B(f)$ by performing a frequency domain correlation of the input baseband traffic signal $X_B(f)$ and the down-converted baseband traffic signal;
a calibrating signal generator coupled to the traffic signal based channel estimator and is configured to generate a calibrating signal based on the channel response estimated by the traffic signal based channel estimator; and
a correction filter coupled to the calibrating signal generator and configured to compensate a subsequent input baseband traffic signal to cancel an image signal of the subsequent input baseband traffic signal during transmission based on the calibrating signal.

13. The channel estimation system of claim 12, further comprising,
a correction filter term generator coupled to the traffic signal based channel estimator,
wherein the correction filter term generator is configured to generate a correction filter term to cancel an image signal of the subsequent input baseband traffic signal during transmission, based on the channel response estimation estimated by the traffic signal based channel estimator, and
the correction filter is coupled to the correction filter term generator and is configured to compensate the subsequent input baseband traffic signal based on the correction filter term generated by the correction filter term generator.

14. The channel estimation system of claim 13, further comprising,
a channel history tracker coupled to the traffic signal based channel estimator; and
a calibrating signal controller coupled to the channel history tracker,
wherein, the channel history tracker is configured to store the channel response estimation generated by traffic signal based channel estimator, and the calibrating signal controller is configured to control the calibrating signal generator to generate the calibrating signal where channel response estimation corresponding to the image signal of the subsequent input traffic signal is not stored in the channel history tracker.

15. A channel estimation system comprising,
a calibrating signal generator configured to generate at least one pair of calibrating signals from which a channel response is estimated,
an up-conversion mixer coupled to the calibrating signal generator and is configured to up-convert the at least one pair of calibrating signals;
a down-conversion mixer coupled to the up-conversion mixer and configured to down-convert the at least one pair of calibrating signals,
a feedback direct current (DC) estimator coupled to the down-conversion mixer and is configured to measure feedback DC estimates based on the down-converted calibrating signals,
a calibrating signal based channel estimator coupled to the feedback DC estimator;
a transmitter (TX) DC estimator coupled to the calibrating signal based channel estimator, and
wherein the TX DC estimator is configured to measure DC levels of the channel estimation system and forward to the calibrating signal based channel estimator,
the calibrating signal based channel estimator is configured to generate the channel estimate based on the feedback DC estimates, the at least one pair of calibrating signals, and the measured DC levels, and
wherein the channel estimate generated by the calibrating signal based channel estimator comprises a channel response at LO frequency.

16. The channel estimation system of claim 15,
wherein the at least one pair of calibrating signals comprises a first calibrating signal $X_{C11}(f)$ and second calibrating signal $X_{C12}(f)$, and are expressed as below:

$$X_{C11}(f)=\Delta_1;$$

$$X_{C12}(f)=\Delta_2,$$

wherein $\Delta_1$ and $\Delta_2$ are random constants of different values.

17. The channel estimation system of claim 16,
wherein $\Delta_2$ comprises $-\Delta_1$.

18. The channel estimation system of claim 16,
wherein the first and second calibrating signals $X_{C11}(f)$ and $X_{C12}(f)$ are generated consecutively by the calibrating signal generator, up-converted consecutively by the up-conversion mixer, and down-converted consecutively by the down-conversion mixer.

19. The channel estimation system of claim 18,
wherein the feedback DC estimator is configured to
generate a first feedback DC estimate $FB_{DC11}$ by performing a DC estimation on a down-converted signal output from the down conversion mixer based on the first calibrating signal $X_{C11}(f)$, and
generate a second feedback DC estimate $FB_{DC12}$ by performing a DC estimation on a down-converted signal output from the down conversion mixer based on the second calibrating signal $X_{C12}(f)$.

20. The channel estimation system of claim 19,
wherein the TX DC estimator (646) is configured to measure DC level $TX_{DC11}$ when first calibrating signal $X_{C11}(f)$ is transmitted, measure DC level $TX_{DC12}$ represents DC levels measured when second calibrating signal $X_{C12}(f)$ is transmitted, and forward the measured DC levels $TX_{DC11}$, $TX_{DC12}$ to the calibrating signal based channel estimator.

21. The channel estimation system of claim 20,
wherein the calibrating signal based channel estimator is configured to generate the channel response estimation at the LO frequency $H_{CH}(0)$ according to an equation below, $$H_{CH}(0)=(FB_{DC12}-FB_{DC11})/[(\Delta_2-\Delta_1)+(TX_{DC12}-TX_{DC11})].$$

22. The channel estimation system of claim 21, further comprising,
a correction term generator coupled to the calibrating signal based channel estimator; and a correction filter coupled to the correction term generator, wherein the correction term generator is configured to generate a correction term based on the channel response estimation at the LO frequency estimated by the calibrating signal based channel estimator, and the correction filter is configured to correct a subsequent baseband traffic signal based on the correction term.

23. The channel estimation system of claim 22, wherein the generated correction term comprises $LO_{CORR}$, which is generated according to an equation below, $$LO_{CORR} = FB_{DC}/H_{CH}(0) - TX_{DC},$$

wherein $FB_{DC}$ is a feedback DC estimate output from the feedback DC estimator based on the subsequent baseband traffic signal, and $TX_{DC}$ is a DC level measured by the TX DC estimator based on the subsequent baseband traffic signal.

24. The channel estimation system of claim 23, further comprising, a channel history tracker coupled to the calibrating signal based channel estimator; and a calibrating signal controller coupled to the calibrating signal generator, wherein the channel history tracker is configured to store a channel estimate generated from the calibrating signal based channel estimator, and the calibrating signal controller is configured to control the calibrating signal generator where no channel response estimation corresponding to a LO frequency is stored in the channel history tracker.

* * * * *